W. MATTHEWMAN.
INTERNAL COMBUSTION ENGINE.
APPLICATION FILED OCT. 15, 1917.
1,317,091.
Patented Sept. 23, 1919.
3 SHEETS—SHEET 1.
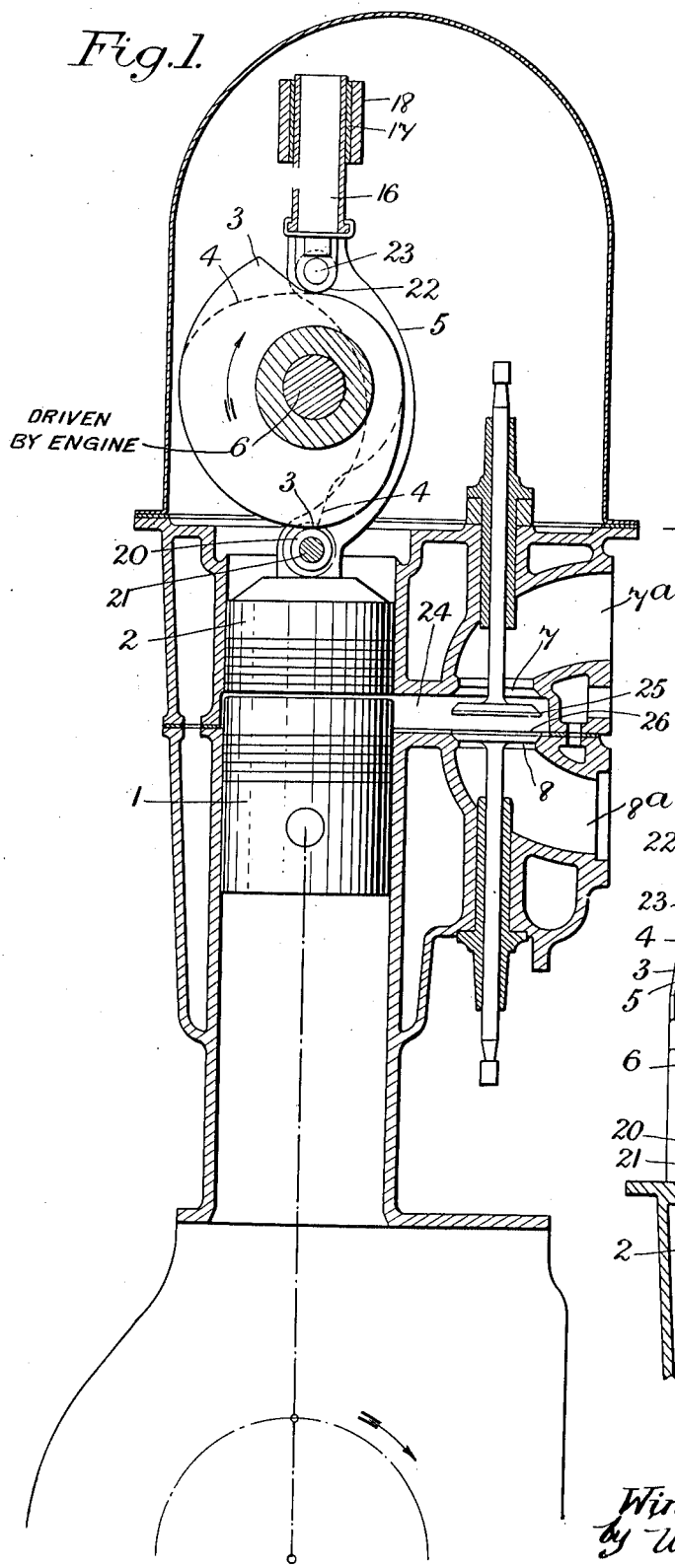
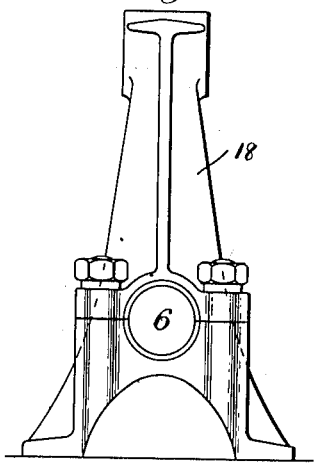
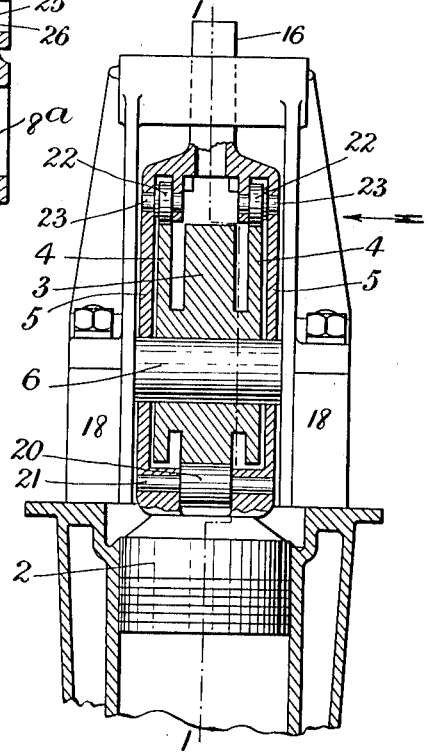
Inventor:
Winfred Matthewman.
by Wilkinson & Giusta
Attorneys.

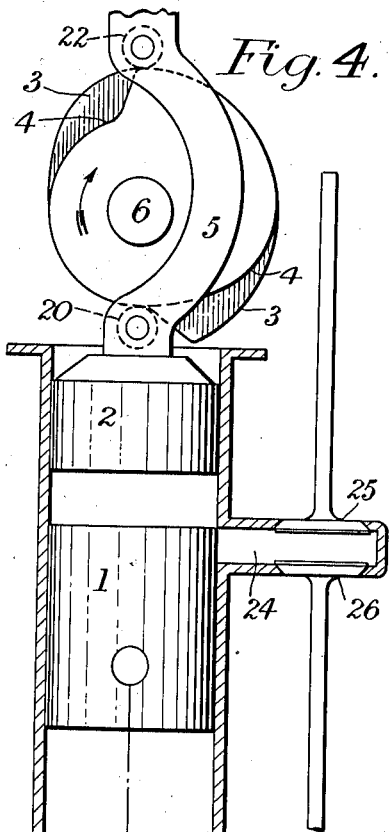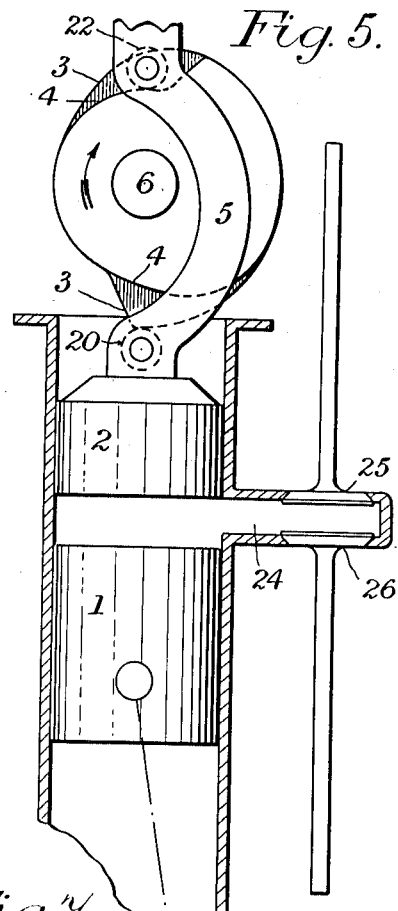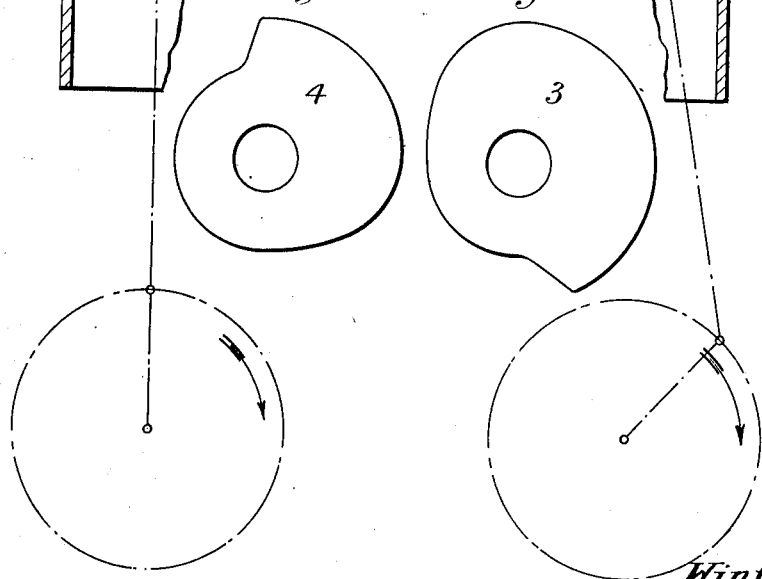

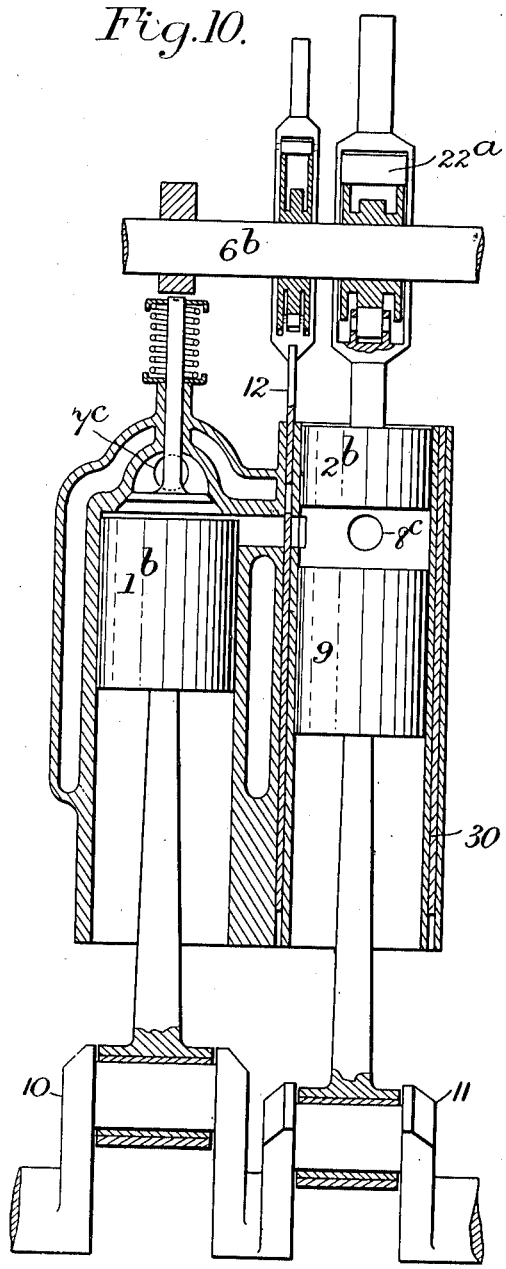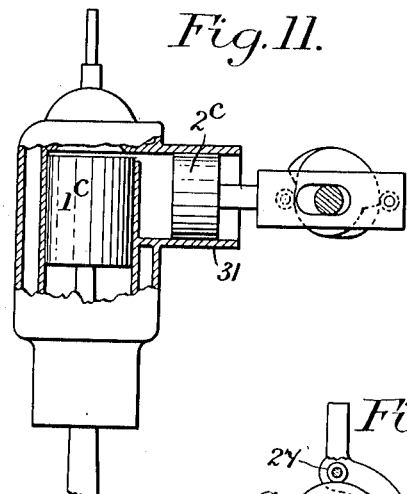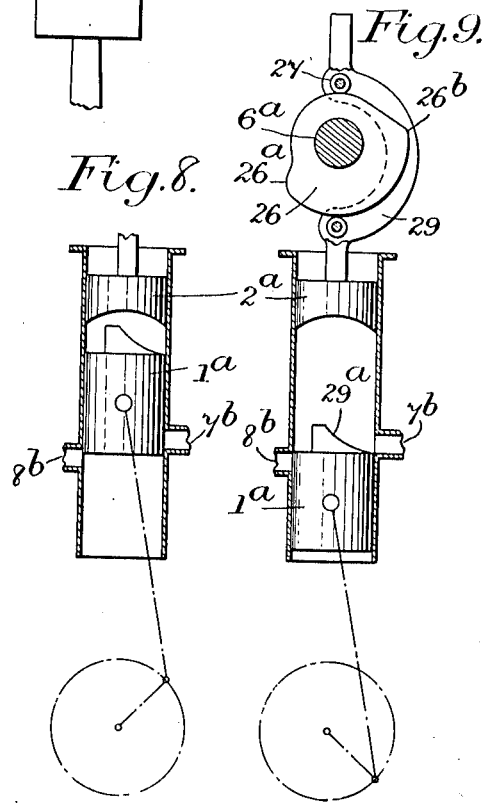

UNITED STATES PATENT OFFICE.

WINFRED MATTHEWMAN, OF LONDON, ENGLAND.

INTERNAL-COMBUSTION ENGINE.

1,317,091.  Specification of Letters Patent.  Patented Sept. 23, 1919.

Application filed October 15, 1917. Serial No. 196,667.

*To all whom it may concern:*

Be it known that I, WINFRED MATTHEWMAN, a subject of His Majesty the King of Great Britain and Ireland, residing at London, England, have invented a new and useful Improvement in Internal Combustion Engines, of which the following is a specification.

This invention relates to internal combustion engines of the well known type in which two pistons are employed in one cylinder, one piston or movable cylinder head being employed for cushioning or assisting in maintaining the charge in its compressed state until ignition occurs, and it has been proposed in engines of this class that such ignition shall take place after the crank has passed its dead center and advanced to about an angle of 45 degrees. When ignition of the charge takes place, it has also been proposed for the second or cushioning piston to be held in its then position by the action of cams or the like. The result is:—as the main piston is traveling much quicker, as the crank and piston rod assume a greater angle one to the other, and a charge of gases occupy a definite period of time before reaching their highest explosion pressure, compression is lost as the space (during the time the gases are rising in pressure) is made much larger, more or less double, according to the speed the engine is running, by the main piston moving farther down and away from the extra piston which stops its travel when ignition occurs. Consequently, the gases cannot reach the same high pressure they would if they were still inclosed in the same space into which they were compressed.

It is a well known fact that although ignition may have previously taken place, complete explosion is not secured until the piston has begun to descend and the crank and piston rod are at an angle to each other so that although the gases may have been ignited when compressed fully or nearly so, owing to the downward movement of the piston the gases when fully exploded occupy a greater cubic space than when ignited, the difference in space depending upon the speed of travel of the piston and the time taken after ignition until full explosion is secured.

It has also been proposed when the crank is away from the dead position to have an ignited charge between two pistons both of which continue to travel in the same direction during the expansion stroke one of the pistons thus necessarily moving against the expanding gases.

The present invention differs from those above indicated in that not only is the charge compressed between two movable pistons contained in one cylinder and held at the time of ignition in a compressed state, but also owing to the movement of the pistons, the exploded gases are caused to occupy the same or substantially the same cubic space as they did at the end of the compression stroke when they have reached their maximum effect, and, when the crank is at an angle away from the dead center, thus imparting to the crank or shaft the full power generated by the explosion without loss of compression and when it is in a position to take full advantage of the power thus obtained and transmit it to do useful work, the parts being so arranged that the extra piston stops its then direction of travel before the completion of the expansion stroke with the object of preventing it from absorbing useful power by traveling against the pressure of the expanding gases. Other details of the invention are hereinafter set forth and are described with reference to the accompanying drawings in which for simplicity sake many details such as sparking plugs valve operating mechanism and the like are entirely omitted or only with other features indicated diagrammatically.

In said drawings:—

Figure 1 represents a side elevation partially in section of an engine of the four cycle type, the parts being in position completing the exhaust, the section being taken on line 1—1 of Fig. 3 but with the cams in a different position to those of said figure:

Fig. 2 is an end view of the bearings bracket carrying the cam shaft:

Fig. 3 an end section of the cams and connected parts operating the supplementary piston:

Fig. 4 is a side elevation partly in section looking in the direction of the arrow (Fig. 3) and shows the position of the cams and pistons when the charge is fully compressed:

Fig. 5 is a similar view to Fig. 4 and shows their position after ignition of the charge and when the force of the explosion has reached its maximum effect:

Fig. 6 is a view of one of the outside cams:

Fig. 7 is a view of the central cam:

Figs. 8 and 9 indicate in side sectional elevation the invention as applied to a two stroke engine:

Fig. 10 is an end section indicating the invention when a supplementary compression cylinder is employed: and Fig. 11 is an end section indicating an arrangement when the second or supplementary piston is carried in a cylinder at right angles to the main cylinder.

Referring first to Figs. 1 to 7, 1 is the main piston, 2 the supplementary or extra piston, 3 is the central cam, 4—4 the outside cams, all of such cams being preferably made in the form shown in one piece, and secured on a driven shaft 6. 5 is a yoke having at its upper end a spindle 16 guided and capable of rising and falling in a bearing 17 of a bracket 18 carrying same and also the shaft 6.

The lower end of the yoke is connected to the piston 2 and carries the rotatable spindle 21 of a roller 20 upon which cam 3 acts. The upper end of the yoke carries in this case two rollers 22, 22, each carried by a short spindle 23, 23, rotatable in said yoke, and upon which the cams 4—4 act.

The inlet port 8 communicates with an inlet passage 8ª and the exhaust port 7 with an exhaust port 7ª both communicating by a common passage 24 with the cylinder, the regulation being effected by valves 25, 26, of a well known type and operated in the usual way.

The cycle of movement with the construction illustrated in Figs. 1 to 7 is as follows:—

The main piston 1 having reached the bottom of its traverse on the induction stroke, the extra piston 2 will be in its uppermost position, see Fig. 3, both pistons having drawn in a full charge of new mixture, the extra piston 2 will remain in this position until the main piston 1 completes the compression stroke (Fig. 4). Then, as the main piston 1 travels down, the extra piston 2 also travels down maintaining the charge in a compressed state and ignition takes place, but the piston 2 continues to move down according to the speed the engine is running, so as to allow for the period of time the gases take to reach their highest explosion pressure, and when the highest pressure is reached, there is the same space, or substantially so, between the pistons as there was at the end of the compression stroke and no compression is lost, the parts then being in the position indicated in Fig. 5, at the same time during this movement the relative positions of pistons 1 and 2 need not be constant. At the same time as the gases reach their highest pressure, the extra piston 2 stops, and the full impulse is given to the crank. The extra piston 2 is now in its lowest position and is there held or locked by the nose of the cam 3 and may remain there until the exhaust gases are driven out through exhaust 7 as indicated in Fig. 1, when the two pistons almost meet, or if the extra piston 2 has traveled down below the point the main piston 1 reaches on the top of its stroke, then the extra piston will rise to slightly above that point to allow clearance between the two pistons, when the main piston completes the exhaust stroke. As the main piston 1 travels down on the inlet stroke, the extra piston 2 moves up owing to the action of the noses of the cams 4 raising the yoke 5 both pistons drawing in a new charge, but the extra piston 2 may travel up much slower, as the movement is relatively small compared with the stroke of the main piston, and will arrive at the top of its stroke, as the main piston reaches the bottom, and thus obtain a steady flow of gases into the cylinder. The cycle of operations is then repeated. The extra piston 2 which constitutes a movable cylinder-head and is therefore hereafter referred to as the extra piston may be in the form of a sleeve, having a closed top to it to carry down the gases, and which is operated by the cam shaft 6, either from underneath or above or at the side of the cylinder, and it will be easily understood that the cycle of operation in this case is exactly the same, as previously described. The speed of the cam shaft 6 of a four stroke engine will be half the speed of the main crank shaft, and the cam shaft will be continuously revolving, when the engine is running, and will be operated by a suitable shaft with suitable gearing or by chains from the main crank shaft, (the gearing being sufficiently strong to take the full force of the explosion), but these parts are not illustrated as they are known devices.

The above description of operation applies equally to a two stroke engine such as shown in Figs. 8 and 9, with the exception that the cam shaft 6ª instead of running at half engine speed, will run at full engine speed, there being only one cam 26 with two noses 26ª, 26ᵇ, operating single rollers 27, 28, in a yoke 29, and the movements of the extra piston 2ª will be slightly different although attaining the same result as to firing and holding the charge in a compressed state, with respect to piston 1ª until the maximum explosive effect has been secured. In this case 7ᵇ is the exhaust and 8ᵇ the inlet passage.

Referring to these figures, as the main piston 1ª is on the top of its compression stroke, the extra piston 2ª is in its uppermost position, then as the main piston travels down, the extra piston 2ª also travels down, and ignition takes place, as previously described in the four stroke engine, the main piston 1ª being driven down, and uncovering the exhaust port 7ᵇ in the usual manner. The extra piston remains in the down position until the main piston is reaching the bottom of its stroke and as there is less space than usual for the expanded gases and they are consequently at a higher pressure they are more rapidly exhausted than in cases where the extra piston is not employed.

The main piston continues its down stroke to uncover the inlet port 8ᵇ and the incoming gases sweep past the baffle 29ª to refill the cylinder and drive out the remaining exhaust. The extra piston will now move up and reaches the top of its stroke before the main piston covers the inlet port, and thus retards any pure gases from going out at the exhaust port by enlarging the cylinder space to normal size and at the same time drawing the gases in by suction, the main piston will then compress the charge, and the operation be repeated.

In the construction indicated in Fig. 10, instead of having an extra piston in the power cylinder, the same end can be attained by employing an attached compressing or pumping cylinder 30 at the side of the main cylinder, in which the extra moving piston 2ᵇ is arranged above a compression piston 9 the extra piston being operated at the desired time by cams and rollers as in Figs. 1 to 7, except that a wide single upper roller 22ª is employed or the piston 2ᵇ is allowed to remain stationary as hereinafter described. The crank 10 of the power piston 1ᵇ in the main cylinder, and crank 11 of the main compressing piston 9 are set at an angle one to the other to obtain the desired movements. In the pumping cylinder 30 the main piston 9 on the suction stroke would travel downward, drawing in a full charge of explosive mixture, (the piston 1ᵇ in the power cylinder at this time would be on its firing stroke) and when it reaches the bottom of its stroke or thereabout, the inlet passage 8ᶜ will be closed. The extra piston 2ᵇ may during this time have remained stationary (or it may also be used as a suction piston) but it will then rise to its upper position as the compressing piston travels upward compressing the charge. The piston 1ᵇ in the power cylinder is now on its exhaust stroke, and is some distance in advance of the pumping piston 9. The piston 1ᵇ when on the top of its stroke has completely scavenged the cylinder, clearing out all gases through the exhaust passage 7ᶜ or it may be several passages (as a series of same (with valves) may with advantage be employed for the purpose of having additional cooling surface) which passage or passages are then closed. As the face of the piston 1ᵇ reaches the top of the cylinder head, or nearly so, a valve or valves say such as 12 (operated by similar cams and rollers to those of the extra piston 2ᵇ) connecting the two cylinders opens, while the pumping piston 9 is some distance from the top of its compression stroke, as the crank 11, is say, at an angle of 45 degrees from the top dead center. The pumping piston 9 now begins to force the charge into the power cylinder, the pumping piston at this time traveling upward much quicker than the power piston is traveling down, but there is a much larger space in the pumping cylinder 30, owing to the extra piston 2ᵇ being in its upper position, and after the two main pistons have been level, i. e., when the pumping piston's crank is say 22½ degrees from the top dead center, and the power crank is 22½ degrees down from the top dead center, the pistons change position as regards speed of travel, and the pumping piston 9 begins to travel slower than the power piston 1ᵇ. High compression has not yet been reached, as the extra piston 2ᵇ is still in its up position, but to make up for the now slow moving pumping piston, the extra piston 2ᵇ now begins to travel down to meet it, and assists in forcing the whole explosive charge into the power cylinder.

The power crank being at a suitable angle to the connecting rod the compressed charge is ignited and further pressure is imparted thereto by the movement of pistons 9 and 2ᵇ until the gases reach their greatest pressure when valve 12 is closed. The piston 1ᵇ is now driven down by the explosion, and the cycle of operations is repeated, the cam shaft 6ᵇ operating the extra piston is also continuously revolving at full engine speed.

If preferred in the type of engine shown in Fig. 10, an extra piston may with advantage be employed in the power cylinder instead of in the compression cylinder or in conjunction with same to enable the charge to be fired without loss of compression with the crank and connecting rod at a still greater angle to each other.

It will be understood that after the pistons have been level as previously stated, the power piston's crank is at a greater leverage, and the gases begin to do useful work at this point, whether ignited or unignited, and this end is also attained in the type of engine having two pistons in the power cylinder when a bell crank lever is employed to operate the extra piston or other movable cylinder head the lever in turn being operated by a cam.

In Fig. 11 instead of having the extra piston 2ᶜ on the top of the cylinder, it is shown as arranged at the side in a short cylinder 31 and this may be an advantage where there is little head room. With this construction as the main piston 1ᶜ on the exhaust stroke reaches the top, leaving only clearing space, it has completely scavenged the cylinder of exhaust gases, the piston 2ᶜ at the side being on its in stroke, as the main piston 1ᶜ travels down drawing in a charge of mixture, the extra piston 2ᶜ travels out or away from the cylinder, and will remain in this position until the main piston 1ᶜ completes the compression stroke, compressing the charge between the side of the main piston, and the face of the extra piston 2ᶜ. As the main piston moves down, the extra piston 2ᶜ moves in, and ignition takes place as both pistons are moving, the ignition being regulated according to the speed the engine is running, to allow for the period of time the gases take to reach their highest explosion pressure, and when the highest pressure is reached, the gases are in the same space as when fully compressed, before ignition, and no compression is lost all as previously described. The extra piston 2ᶜ is now in its inner position, and will remain there until the exhaust stroke is completed, and all the gases driven out, when the cycle of operations is repeated.

The extra piston 2ᶜ is operated by cams and rollers similar to those of Fig. 10 or of Figs. 1 to 7. The extra piston 2ᶜ may also be arranged to travel farther into the cylinder, for the purpose of still further reducing the cylinder space, and in this case the extra piston 2ᶜ will move outwardly, to allow clearance for the main piston to let it perform its exhaust stroke. It will be clearly understood that these operations can be performed in the same manner by employing more than one extra piston in the cylinder head.

When this method is applied to the rotary type of engine there is no need for a revolving cam to operate the cylinder head as the engine is well adapted for a fixed cam, in principle it is exactly the same except that the engine revolves instead of the cam, the cylinder head may be operated by a bell crank or other lever attached to a rod having a roller at the end which would run around the fixed cam to secure the desired movement.

It will be seen that there are many ways of attaining the desired object, and that the charge may be fully exploded when the crank and piston rod are at any suitable angle to each other, without loss of compression, and may with slight modifications be applied to any type of internal combustion engines, the various ways described being sufficient to illustrate same.

What I claim is—

1. In an internal combustion engine and in combination, a cylinder, a compression piston, an extra piston co-acting with such piston, and operating means for the extra piston, said operating means adapted to move the extra piston in company with the compression piston during the initial portion of the expansion stroke until ignition of a charge takes place and subsequently to the ignition while the resulting gases are rising in pressure to their highest explosive pressure, whereby the exploded gases between the two pistons occupy the same, or substantially the same cubic space when they reach their full explosive effect as they did at the end of the compression stroke, the extra piston stopping its then direction of travel before the completion of the expansion stroke so that it does not move against the pressure of the exploded gases.

2. In an internal combustion engine, and in combination, a cylinder, a compression piston, an extra piston co-acting with such piston and operating and locking means for the extra piston, said operating means adapted to move the extra piston in company with the compression piston during the initial portion of the expansion stroke until ignition of a charge takes place and subsequently to the ignition while the resulting gases are rising in pressure to their highest explosive pressure, whereby the exploded gases between the two pistons occupy the same or substantially the same cubic space when they reach their full explosive effect as they did at the end of the compression stroke, the extra piston stopping its travel for this purpose when the ignited gases reach their greatest pressure.

3. In an internal combustion engine, and in combination, a cylinder, a main piston therein, a further cylinder connected thereto, a compression piston and an extra piston co-acting with the compression piston in the second named cylinder and operating means for the extra piston, said operating means adapted to move the extra piston in company with the compression piston during the initial portion of the expansion stroke until ignition of a charge takes place and subsequently to the ignition while the resulting gases are rising in pressure to their highest explosive pressure, whereby the exploded gases between the two pistons occupy the same, or substantially the same cubic space when they reach their full explosive effect as they did at the end of the compression stroke, the extra piston stopping its then direction of travel before the completion of the expansion stroke so that it does not move against the pressure of the exploded gases.

4. In an internal combustion engine, and in combination, a cylinder, a compression piston, a driven shaft, a crank on same, and a connection with such piston, an extra piston co-acting with the compression piston, and operating means for the extra piston, said operating means adapted to move the extra piston in company with the compression piston during the initial portion of the expansion stroke until ignition of a charge takes place and subsequently to the ignition while the resulting gases are rising in pressure to their highest explosive pressure, whereby the exploded gases between the two pistons occupy the same, or substantially the same cubic space when they reach their full explosive effect as they did at the end of the compression stroke, and when the crank is at an angle away from the dead center, the extra piston stopping its travel for this purpose.

5. In an internal combustion engine, and in combination, a cylinder, a compression piston, an extra piston co-acting with such piston, and operating and locking means for such extra piston, said operating means adapted to move the extra piston in company with the compression piston during the initial portion of the expansion stroke until ignition of a charge takes place and subsequently to the ignition while the resulting gases are rising in pressure to their highest explosive pressure, comprising a revoluble shaft and a cam thereon whereby the exploded gases between the two pistons occupy the same or substantially the same cubic space when they reach their full explosive effect as they did at the end of the compression stroke, the extra piston being locked against movement for this purpose by the locking means.

In witness whereof I have hereunto set my hand.

WINFRED MATTHEWMAN.